US009726555B2

(12) United States Patent
Mizuno

(10) Patent No.: US 9,726,555 B2
(45) Date of Patent: Aug. 8, 2017

(54) THERMOMETER MANAGEMENT SYSTEM

(71) Applicant: Yoshiro Mizuno, Tokyo (JP)

(72) Inventor: Yoshiro Mizuno, Tokyo (JP)

( * ) Notice: Subject to any disclaimer, the term of this patent is extended or adjusted under 35 U.S.C. 154(b) by 392 days.

(21) Appl. No.: 14/398,171

(22) PCT Filed: Jan. 27, 2014

(86) PCT No.: PCT/JP2014/051695
§ 371 (c)(1),
(2) Date: Oct. 31, 2014

(87) PCT Pub. No.: WO2014/119518
PCT Pub. Date: Aug. 7, 2014

(65) Prior Publication Data
US 2015/0110147 A1    Apr. 23, 2015

(30) Foreign Application Priority Data

Feb. 4, 2013    (JP) .................................. 2013-019083

(51) Int. Cl.
*G01K 1/02*    (2006.01)
*G01K 15/00*    (2006.01)
*H04Q 9/00*    (2006.01)

(52) U.S. Cl.
CPC ............. *G01K 15/005* (2013.01); *G01K 1/02* (2013.01); *G01K 1/024* (2013.01); *G01K 1/026* (2013.01);
(Continued)

(58) Field of Classification Search
CPC ....................................................... G01K 3/04
See application file for complete search history.

(56) References Cited

U.S. PATENT DOCUMENTS 5,917,416 A    6/1999    Read
5,960,085 A *  9/1999    de la Huerga ........ A61J 1/1437
                                                        235/380
(Continued)

FOREIGN PATENT DOCUMENTS

JP          11132865 A  *  5/1999
JP          2001-33316 A    2/2001
(Continued)

OTHER PUBLICATIONS

Extended European Search Report issued on Nov. 4, 2016 for related European Patent Application No. 14745859.0.

*Primary Examiner* — Clayton E Laballe
*Assistant Examiner* — Leon W Rhodes, Jr.
(74) *Attorney, Agent, or Firm* — Enshan Hong; VLP Law Group LLP

(57) ABSTRACT

A body of a thermometer (1001), a first location to be measured (1002), a second location to be measured (1003) and a third installation location (1004) is established by the thermometer management system. Further, communication lines (1005) are connected to network units at each location to be measured. Network units relay the sensor output from a sensor part to the communication lines. A sensor part is fixed to an object to be measured and sends a sensor output in response to the temperature of the object to be measured. A network unit has a radio frequency identifier (RFID) reader and transmits to the thermometer body commands and the like stored in the memory of an RFID card in response to approach of the RFID card arranged corresponding to a location to be measured. The thermometer body receives the commands and the like and performs predetermined operations.

6 Claims, 18 Drawing Sheets

(52) U.S. Cl.
CPC .......... *H04Q 9/00* (2013.01); *G01K 2207/06* (2013.01); *H04Q 2209/47* (2013.01); *H04Q 2209/823* (2013.01)

(56) References Cited

U.S. PATENT DOCUMENTS

| | | | | |
|---|---|---|---|---|
| 6,215,405 | B1* | 4/2001 | Handley | G08B 17/06 340/521 |
| 7,023,341 | B2* | 4/2006 | Stilp | G06K 7/0008 340/545.1 |
| 7,374,096 | B2* | 5/2008 | Overhultz | G06Q 30/02 235/383 |
| 8,466,774 | B2* | 6/2013 | Lopez | B60R 25/24 340/5.61 |
| 8,808,178 | B2* | 8/2014 | Lane | A61B 5/01 128/920 |
| 9,237,603 | B2* | 1/2016 | Shim | H04W 52/0235 |
| 2005/0257822 | A1 | 11/2005 | Smith | |
| 2007/0040692 | A1 | 2/2007 | Smith | |
| 2013/0033381 | A1* | 2/2013 | Breed | B60T 1/005 340/568.1 |

FOREIGN PATENT DOCUMENTS

| | | | |
|---|---|---|---|
| JP | 2002-288775 | A | 10/2002 |
| JP | 2005-142855 | A | 6/2005 |
| JP | 2008-15855 | A | 1/2008 |
| JP | 2011-177499 | A | 9/2011 |
| JP | 2012-198037 | A | 10/2012 |
| WO | 2007-055015 | A | 5/2007 |

* cited by examiner

FIG.11

| OUTPUT SUB SECTI -ONS | DIGITAL OUTPUT (S) | MEASURED TEMPERATURE (T) | CALCULATED VALUE (T-S) | UNCERTAINTY |
|---|---|---|---|---|
| 1 | S1 | 45.0 | K1 | ±0.1 |
| 2 | S2 | T2 | K2 | ±0.1 |
| ⋮ | ⋮ | ⋮ | ⋮ | ⋮ |
| x | Sx | Tx | Kx | ±0.1 |
| ⋮ | ⋮ | ⋮ | ⋮ | ⋮ |
| n | Sn | 90.0 | Kn | ±0.1 |

11001, 11002, 11003, 11004, 11005, 11006, 11007, 11008

THERMOMETER MANAGEMENT SYSTEM

PRIORITY CLAIM

This is a U.S. national stage of application No. PCT/JP2014/051695, filed on Apr. 27, 2014. Priority is claimed on the following applications: Country: Japan, Application No.: 2013-019083, Filed: Feb. 4, 2013), the content of which is incorporated here by reference

TECHNICAL FIELD

The present disclosure relates to a management system for a thermometer, and particularly to a management system for a thermometer that receives digital output of a digital probe of a thermometer and generates a display temperature in reference to the digital probe's temperature characteristics of the digital probe being stored in a predetermined memory device.

The digital probe here is a term used to indicate a sensor part that converts output of a heat sensor element to output digital signals.

BACKGROUND ART (Accuracy Management)

A highly accurate thermometer is an expensive precision apparatus. When degradation of temperature characteristics is probable, from an economical and reasonable point of view, it is common that accuracy management is performed by calibrating thermometers, not by replacing thermometers. A standard calibration procedure is as follows. That is, removing the thermometer from an object to be measured, carrying the thermometer to be calibrated (hereinafter, referred to as calibrating thermometers) into a calibration facility, adjusting accuracy, carrying the calibrated thermometer back to the original location and resetting the thermometer to the object to be measured to be measured.

The calibration work has been performed in a thermometer assembly. Even in a case of a thermometer having a plurality of sensor parts, or when only some sensor parts are required to be calibrated, a whole system has been carried.

(Condition Management)

Some recent thermometers have a function to notify or record an error for a predetermined temperature error. The following problem occurs in an object in which temperatures are monitored by this type of thermometer, for example, in a chiller. If the door of the chiller is opened for cleaning, the thermometer inside detects an error even if the work is a common maintenance work. It is common to handle this function by accessing the computer of the thermometer body and temporarily cancelling the alarm function.

However, in a case of a thermometer monitoring a plurality of monitoring objects, when maintenance workers are going to stay and clean a monitoring location, it would be a cumbersome operation to access a computer working in the background and to specify a probe for which the alarm is to be cancelled. Because computer terminals for input are not often located around monitoring objects and one cannot make use of advantages of the location.

CITATION LIST

Patent Literature

Patent Literature 1: Unexamined Japanese Patent Application Kokai Publication No. 2012-198037.

Patent Literature 1 relates to a temperature drift correction device that corrects a temperature drift generated in an analog front-end circuit. Patent Literature 1 describes a configuration for avoiding carrying the device itself out to a calibration facility having a large-scale constant temperature reservoir. The configuration comprises:

a thermometer that detects a temperature of an analog front-end circuit;

a heater for heating the analog front-end circuit;

a memory for storing temperature characteristics based on the input-output characteristics of the analog front-end circuit for cases in which the heater is on and off and based on the temperatures for the heater on and off cases; and a correction arithmetic circuit that corrects the temperature drift of the analog front-end circuit at the thermometer detecting temperature using the temperature characteristics regarding a digital output signal passing through the analog front-end circuit and converted from analog to digital.

As such a configuration comprises a heater, one does not need to use a large-scale apparatus such as a constant temperature reservoir. The configuration can precisely correct the temperature drift generated in the analog front-end circuit by storing temperature characteristics based on the input-output characteristics of the analog front-end circuit for cases in which the heater is on and off and based on the temperatures for the heater on and off cases.

However, accuracy management of the level in a calibration facility having a full-scale constant temperature reservoir cannot be expected by the heat from the heater heating the analog front-end circuit corresponding to the sensor part of the disclosure of the present application. This absolutely is a level of a second-best counter measure for avoiding cumbersome delivery operations.

Patent Literature 2: Unexamined Japanese Patent Application Kokai Publication No. 2011-177499.

Patent Literature 2 describes a thermometer in which an operation mode controller switches the operation from the power save mode to the measuring mode when the operation mode controller detects approach of a person to be measured via the temperature data calculator.

However, the mode switch described in Patent Literature 2 is performed by being triggered by the sensor that detects whether a person to be measured approaches or not, or by passage of predetermined time. Managing each probe is difficult when a plurality of probes for switching modes exist. There is also a problem that the mode is switched even when an approaching person does not have intention for switching modes such as the maintenance mode or the like

SUMMARY OF INVENTION

Technical Problem

The object of the present disclosure is to simplify a cumbersome work regarding thermometer management.

(Condition Management)

When a storing material kept by the temperature managing apparatus is stored in or delivered from the storage, or when the inside of the storage is cleaned, the conditions in the storage may be different from normal conditions. In such a case, one of the problems is to provide a system in which the person in charge of the work can easily set to inform and/or change the temperature managing operation modes, easily making temperature management suitable for the present condition.

(Accuracy Management)

Furthermore, thermometers need to be calibrated to manage the accuracy of temperature measurements periodically or as necessary. It is also an object to provide a system in which one can separate only a digital probe to be calibrated from the thermometer having the digital probe, send the digital probe to a calibration facility, mount the calibrated digital probes easily and without an error, and make cumbersome operation set-ups.

Especially, there is a problem providing a management system in which a thermometer having a plurality of digital probes can be calibrated for each of the digital probes, the system being capable of avoiding a cumbersome delivery such as removing other digital probes and/or thermometer body which are not directly related to calibration on the spot achieving the accuracy management level of calibration facilities having a constant temperature reservoir.

There is also a problem providing a management system in which a person not in charge of calibration nor having expert knowledge can easily perform the work of setting calibration data such as calibration values which are the result of the past calibration and formulae, into the thermometer to be calibrated.

Solution to Problem

In order to solve the problem of the present disclosure, the disclosure of a first aspect provides a thermometer management system comprising components of:

a) one or more digital probes that include a probe that senses and reacts to a temperature of an object to be measured, and that output a digital output which the probe output is digitized;

b) a display temperature generator that inputs the digital output and generates a display temperature;

c) a management operation execution means that executes, according to a received predetermined command, a predetermined management operation that is associated with the command;

d) an RFID tag that stores the command; and e) an RFID reader that transmits information received from the RFID tag to the management operation execution means of c) above;

wherein the command b) above is transmitted to the management operation execution means c above by being triggered by the RFID tag of d) above approaching close to the RFID reader of e) above, and the management operation is executed, and wherein the management operation execution means of c) above further comprises an alarm that detects an abnormal temperature and alarms according to a plurality of alarm operation modes, the management operation comprising execution of the switching function of the plurality of alarm operation modes.

RFID stand for Radio Frequency Identification. This term is used to indicate the technique in general of exchanging information within a short distance (several centimeters to several meters depending on frequency bands) radio communication from a tag in which ID information is embedded.

The above management operation may further comprise execution of a function specifying the person in charge of switching.

In the disclosure of a first aspect, the object to be measured is within the storage of temperature managing apparatuses;

the management operation execution means is disposed in the temperature managing apparatus; and the alarm operation mode may comprise at least one operation mode selected from the cleaning mode which is set during the maintenance of the storage, the storing mode which is an operation mode when an object is being stored in the storage and the delivery mode which is an operation mode when a stored object is being delivered from the storage.

If data indicating a display temperature reference generated during execution of the maintenance, storing and delivery operations corresponding to the herein described operation mode are prepared and registered in the memory device disposed in the system, alarm operations in the operation modes corresponding to each of the above executions can reference data indicating the reference and determine whether there is an error or not according to the condition of objects to be measured.

In the disclosure of a first aspect, the switching function may be a toggle switch function of the alarm operation mode, and may alternatively switch modes by being triggered by the RFID tag approaching close to the RFID reader.

In the disclosure of a first aspect, the RFID reader may be disposed at a network unit that intervenes with communication between the digital probe disposed at the location of the object to be measured and the management operation execution means.

The network unit here is a unit having a function for connecting networks having different topologies such as connecting a field network (Ethernet (registered trademark)) to which a digital probe disposed at the location of the object to be measured belongs with a network to which a management operation execution means belongs. This network unit also has a server function as necessary.

In the disclosure of a second aspect, a thermometer management system comprising components of:

a) one or more digital probes that include a probe that senses and reacts to a temperature of an object to be measured, and that output a digital output which the probe output is digitized;

b) a display temperature generator that inputs the digital output and generates a display temperature;

c) a management operation execution means that executes, according to a received predetermined command, a predetermined management operation that is associated with the command;

d) an RFID tag that stores the command; and e) an RFID reader that transmits information received from the RFID tag to the management operation execution means of c) above;

wherein the command of c) above is transmitted to the management operation execution means of c) above by being triggered by the RFID tag of d) above approaching close to the RFID reader of e) above and the management operation of c) above is executed, and wherein generation of the display temperature of b) above is executed referencing a predetermined calibration table; and wherein the management operation of c) above is a calibration operation for updating the calibration table and further, a calibration table for the update is further stored in the RFID tag of d) above.

Adoption of such a management system has an effect of omitting removal of a thermometer body and/or digital probes that need not be calibrated and omitting delivery for calibration for accuracy management.

Incorporation of calibration results into the body of the thermometer also becomes simple by simply having a predetermined RFID tag approach near a predetermined RFID reader and updating a calibration table to be referenced.

Furthermore, because only digital probes that are required to be calibrated can be calibrated, it becomes possible to easily perform fine accuracy management for each object to be measured.

BRIEF DESCRIPTION OF DRAWINGS

FIG. 11 is a table showing contents of a calibration table.

DESCRIPTION OF EMBODIMENTS

Hereinafter, a first embodiment and a second embodiment of the present disclosure are explained with reference to drawings.

Please note that the first embodiment corresponds to the second aspect of the disclosure and the second embodiment corresponds to the first aspect of the disclosure.

First Embodiment

Figure 1:
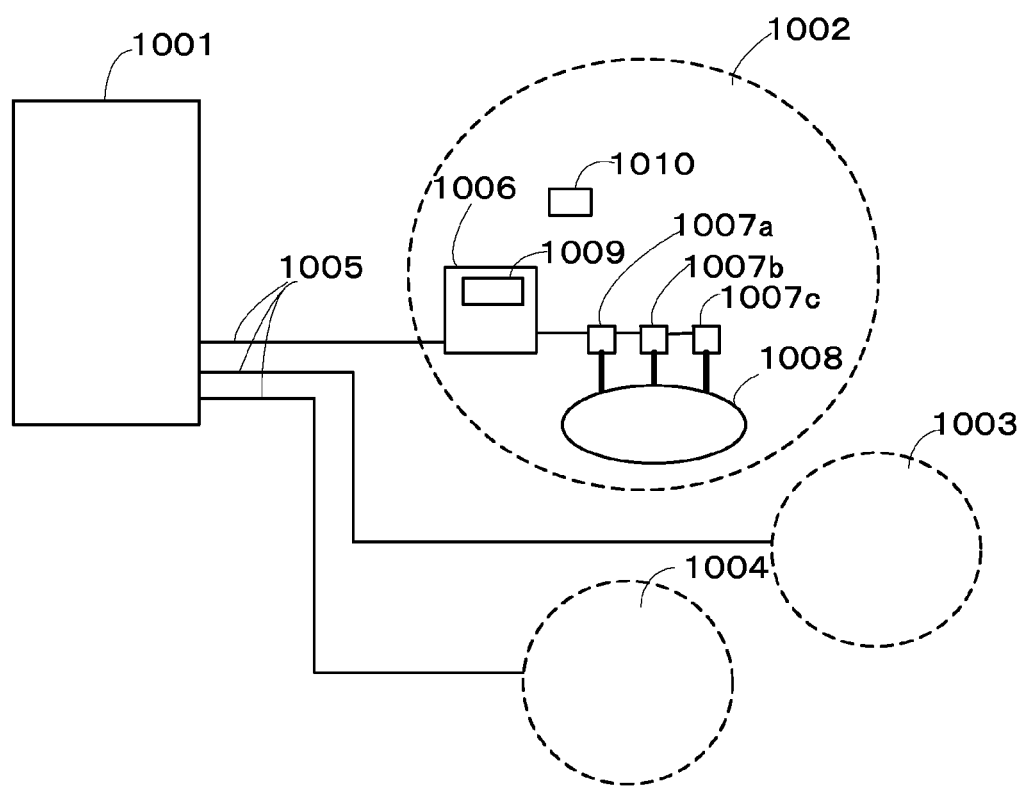
FIG. 1 is an external view showing an installation condition of a thermometer in a first embodiment.

FIG. 1 is an external view showing an installation condition of a thermometer in a first embodiment. A temperature body 1001, a first location to be measured 1002, a second location to be measured 1003 and a third location to be measured 1004 are established. Although this embodiment has three locations to be measured, the number of locations to be measured of the present disclosure is not limited to three and the number can be appropriately changed depending on object to be measured and characteristics of temperature measuring works.

The three locations to be measured and the temperature body 1001 are connected via communication lines 1005. Apparatuses installed at the first location to be measured are explained in detail. The detail described here is similarly applied to the second location to be measured and the third location to be measured. The communication lines 1005 are connected to a network unit 1006. The network unit is connected to three digital probes 1007a, 1007b and 1007c via a daisy chain, and relays the digital output from the digital probes to the communication lines. The digital probes are fixed with regard to a object to be measured 1008 and send digital output in response to the temperature of the object to be measured. Although the thermometer of this embodiment is configured to have three digital probes, the thermometer of the present disclosure is not limited to this and other types can appropriately be adopted depending on temperature objects to be measured and thermometer installation sites. Connections of each digital probe and the network are also not limited to this type of connection, and can be appropriately changed to such as the star shaped connection depending on the number and installation conditions of digital probes. The network unit 1006 comprises an RFID reader 1009 and sends the data stored in the memory of this card to the body in response to an approach of an RFID card 1010 disposed corresponding to the first location to be measured 1002.

Figure 2:
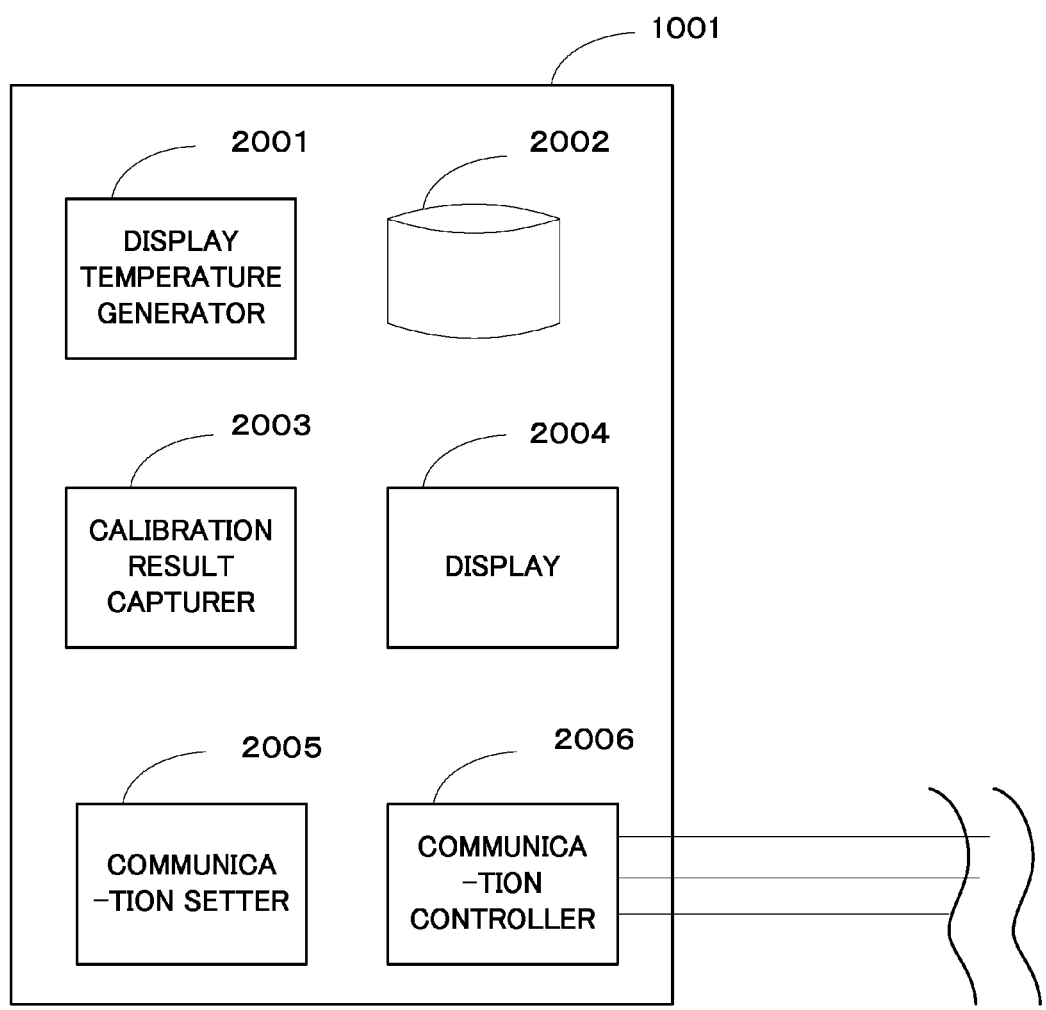
FIG. 2 is a configuration diagram of a thermometer body.

FIG. 2 is a block diagram showing the internal configuration of the thermometer body 1001 which comprises a display temperature generator 2001, a memory 2002 in the thermometer body, a calibration result capturer 2003, a display 2004, a communication setter 2005 and a communication controller 2006. Each function shown here is materialized by executing a control program such as preassembled firmware or the like in a processor of a control circuit and by cooperating with various devices implemented. These programs are recorded in a computer readable recording medium, read from the recording medium by the processor and executed by user's operations or by receiving signals from a device comprising a controller.

Although the calibration result capturer adopts a system in which the calibration result capturer is a component of the thermometer body in this embodiment, a system may be adopted in which the calibration result capturer of the present disclosure may be installed as a separate module and electrically connected to the thermometer body and/or the RFID reader.

The display temperature generator 2001 receives a digital output, references the calibration table stored in the memory 2002 in the thermometer body and generates a display temperature.

The calibration table here is defined as an information table in which digital output and values calibrated to actual temperatures are associated and recorded. The calibration table has a data structure that can easily generate a display temperature by searching a calibrated value corresponding to the digital output. Even when the calibrated value does not completely match the digital output, a display temperature corresponding to any digital output can be generated by appropriately adopting a method in which an average value of recorded information adjacent digital output is taken as the display temperature and the like.

(Management of Measurement Accuracy)

The calibration result capturer 2003 is a function executing the management operation related to measurement accuracy. When the RFID card 1010 approaches near the RFID reader 1009, this calibration result capturer receives a calibration execution command stored in the RFID card and copies the calibration table stored in the memory 2002 in the thermometer body to the calibration table stored in the RFID card 1010 to update the calibration table.

The calibration table before being rewritten may adopt a method in which the calibration table data before being rewritten is not deleted and is retained in the memory in the thermometer body or in the RFID card as past data. As deterioration of digital probes due to aging can be determined by chronologically analyzing the calibration values of the calibration table retained in this way, the present disclosure is effective for quality management such as digital probe replacements and the like.

The display 2004 comprises a display device such as liquid crystal or the like, and displays a display temperature generated from the digital output from the digital probes.

Additionally, the display 2004 may display documents certifying the legacy of the standard used in the calibration work associated with the calibration table stored in the memory 2002 in the thermometer body and/or in the RFID card 1010. Accuracy management of thermometers can be easily checked by computerizing, storing, displaying and checking documents which had conventionally been issued in paper accompanying a calibration work.

(Data Structure Stored in an RFID Card)

The data stored in the RFID card 1010 is explained. Although the explanation relates to an RFID card corresponding to a first location, this explanation also applies to RFID cards corresponding to other locations to be measured.

Figure 3:
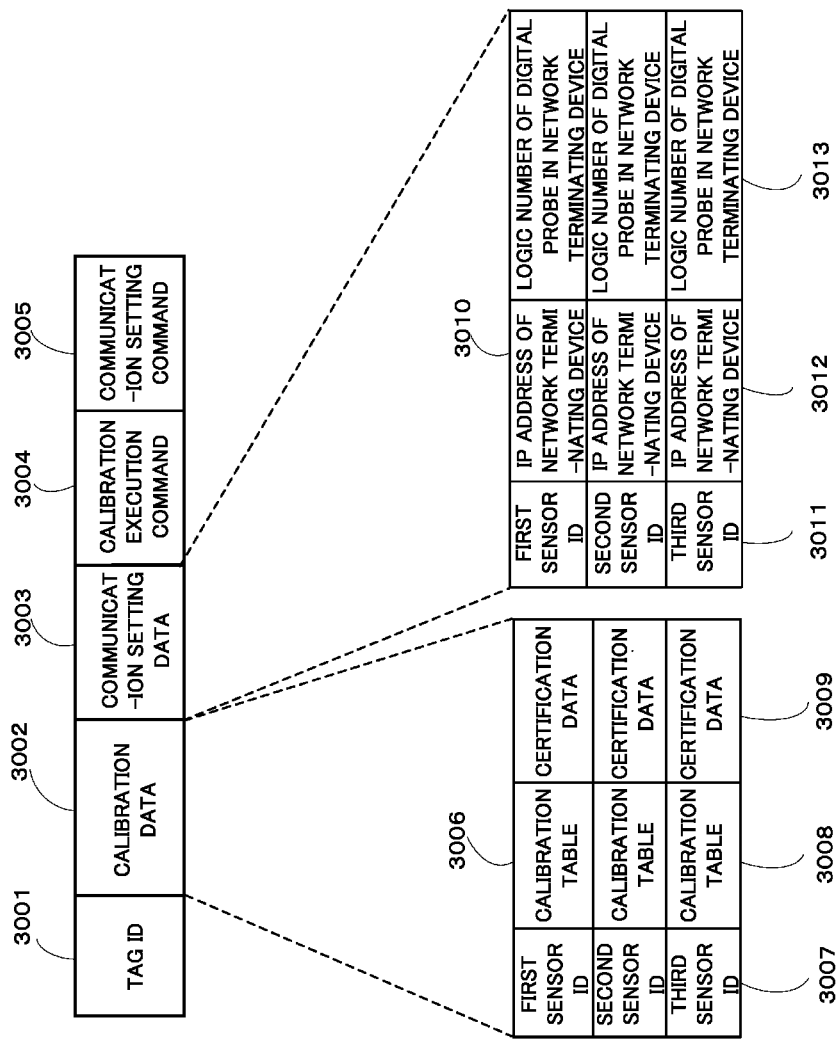
FIG. 3 is a block diagram showing a data structure stored in an RFID card.

FIG. 3 shows a data structure stored in an RFID card. This is a structure comprising items of a tag ID 3001, calibration data 3002, communication setting data 3003, a calibration execution command 3004 and a communication setting command 3005.

The calibration data comprises sensor IDs 3007 of each digital probe, calibration tables 3008 corresponding to each digital probe and certification data 3009 corresponding to each digital probe as shown in 3006 in detail.

The communication setting data comprises sensor IDs 3011 of each digital probe, IP addresses 3012 of the network units corresponding to each digital probe and logical numbers 3013 of the digital probes in the networks corresponding to each sensor part as shown in 3010 in detail.

Each detailed configuration shown here is merely an example. It is possible to classify an RFID card being approached for calibration and another RFID card being approached for communication setting by making two separate RFID cards for managing measurement accuracy and for establishing communication.

(Functions Included in RFID Card)

Figure 4:
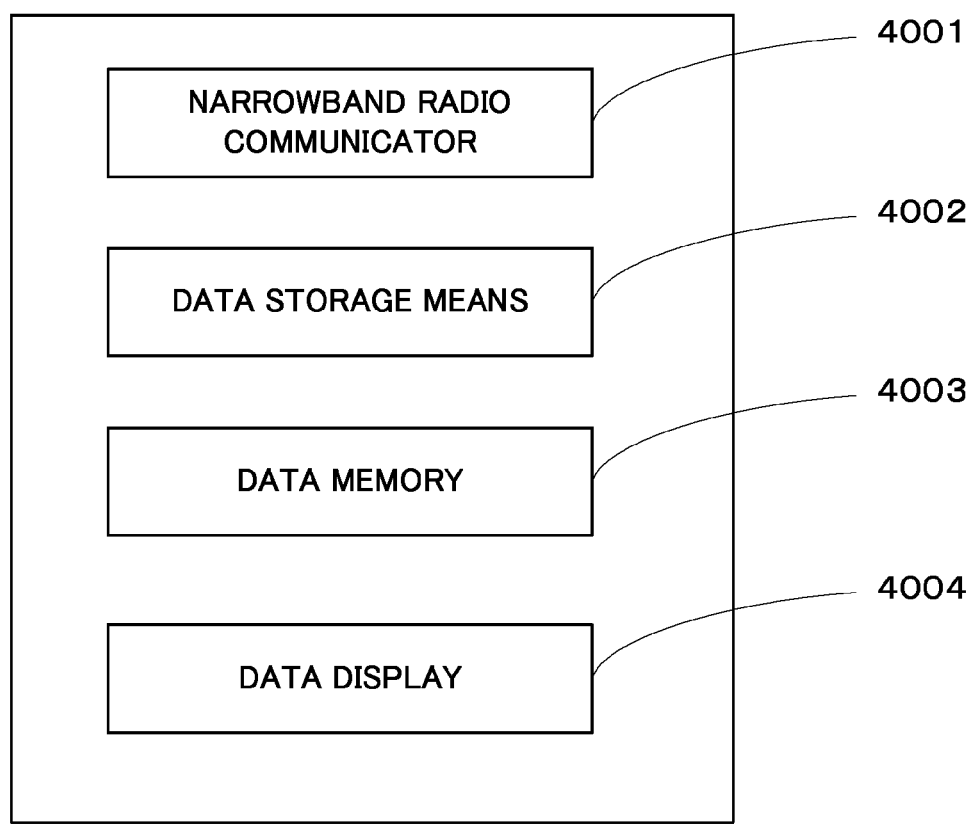
FIG. 4 is a block diagram showing a functional configuration of the RFID card.

FIG. 4 shows an example of a functional configuration of an RFID card adopted in the examples.

This configuration includes a narrow band radio communicator 4001 that performs communication solely by approaching close to an RFID reader for executing non-contact communication, data storage means that stores calibration data and the like into data memory 4003 and a data display 4004.

The data display is a component that an RFID card does not usually have. The data display appropriately adopts a liquid crystal display device, an electronic paper, a printing label and the like. The data display here displays certification data included in the calibration data.

A certificate certifying that the calibration work has been done is usually printed on a paper and delivered with a thermometer and/or a sensor part from a calibration location. As a person in charge can visually check that the calibration is properly done on site by being displayed by display means of the RFID tag managed at the location to be measured with the calibrated sensor part, reliability of digital probes used on site can be easily checked and credibility of the thermometer is increased.

(Management of Communication Establishment)

The communication setter 2005 has a function performing a management operation regarding communication. The communication setter receives a communication setting command stored in the before mentioned RFID card and incorporates the content of the communication setting data 3003 into a region of the memory in the thermometer body, the region relating to communication control. The incorporation operation is performed in such a way that narrow band radio communication is performed by approaching an RFID card 1010 corresponding to a location to be measured close to an RFID reader 1009 disposed at a network unit installed at the location, and an IP address of a sensor ID of a digital probe to be set and a logical number of the digital probe to be set are automatically established by being triggered by the communication setting command 3005 stored in the RFID card being sent to the thermometer body.

The communication controller 2006 can communicate with the digital probe disposed at the location to be measured with reference to the IP address and logical number of the communication setting data registered in the memory 2002 in the thermometer body by the incorporation operation.

Figure 5:
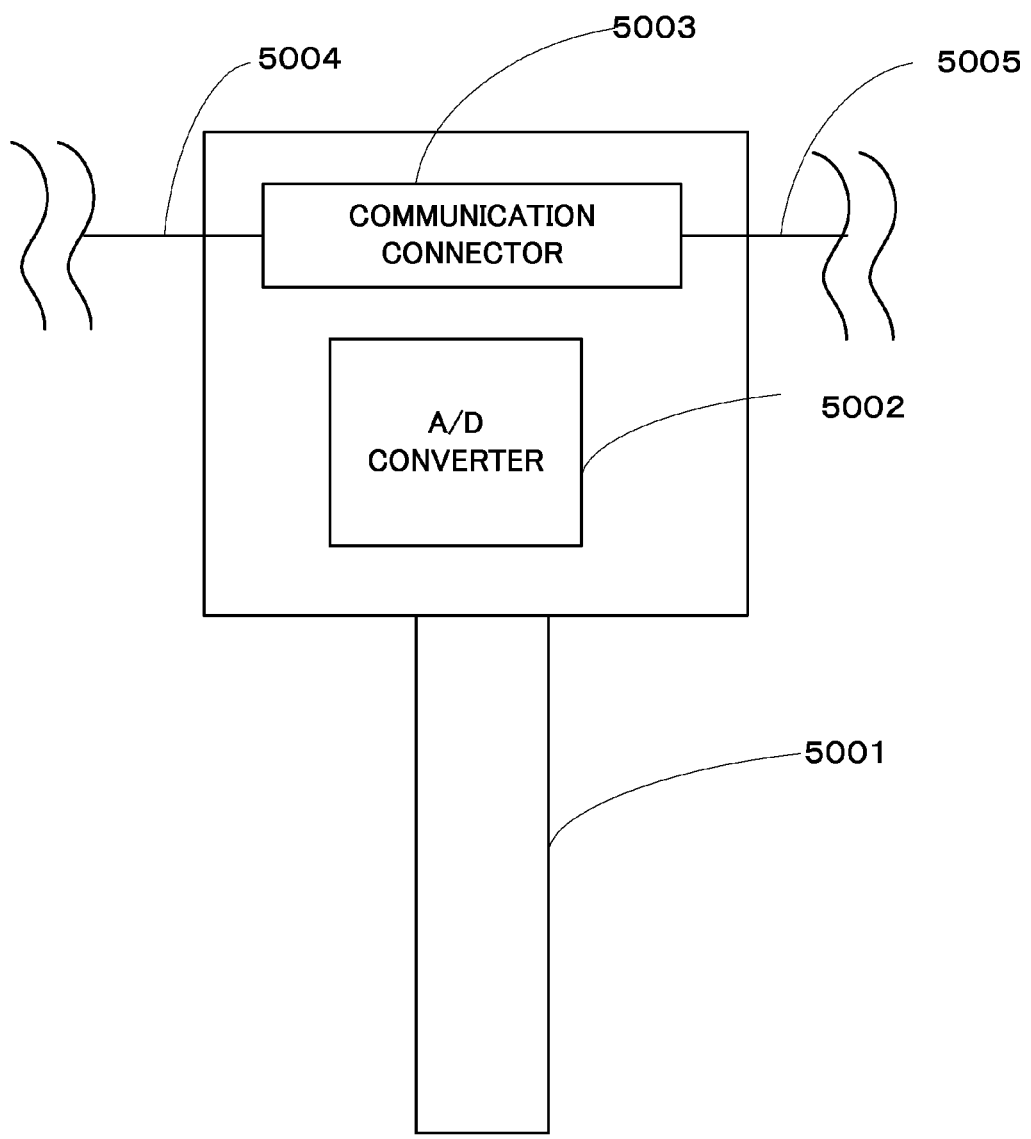
FIG. 5 is a block diagram showing a configuration of a digital probe.

FIG. 5 shows a configuration of the digital probe 1010 which comprises a probe 5001 that senses the temperature of a object to be measured and sends an analog signal, an analog-digital converter 5002 that converts the analog output of a probe into a digital output and a communication connector 5003 that transmits digitized digital output. As the daisy chain connection is adopted for the communication connection with the network unit 1006, the digital probe 1010 has two connection terminals referred to as 5004 and 5005. Although the daisy chain connection is adopted here, the star shaped connection and the like, if suitable for the intent of the disclosure of the present application, can be appropriately adopted depending on the characteristics of the object to be measured and/or the number of digital probes.

Figure 6:
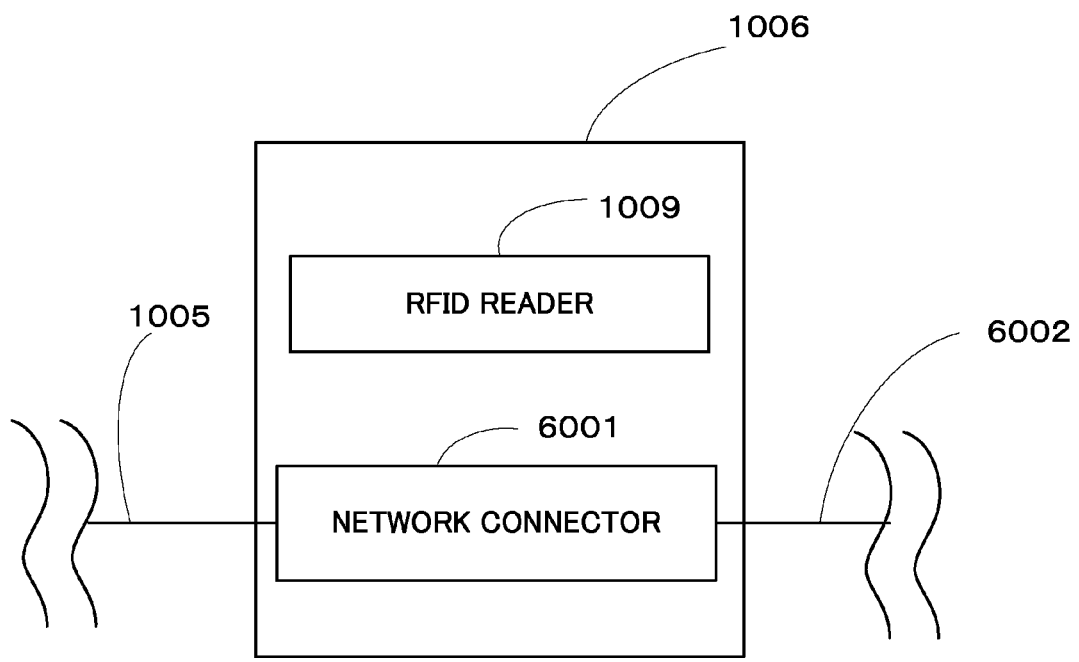
FIG. 6 is a block diagram showing a configuration of a network unit.

(Network unit) FIG. 6 shows a configuration of the network unit 1006 which comprises the RFID reader 1009, as mentioned before, and further comprises a network connector 6001 that connects a connection to a digital probe 6002 and communication lines 1005. The network unit 1006 performs transmission of calibration data and/or calibration data capturing command by the approach of the RFID card 1010 in which calibration data and/or calibration execution command are stored. A terminating device of a network to which the digital probe belongs can be adopted as a network connector and a terminating device, having a function for connecting to the management operation execution means that belongs to networks having different topologies, can be appropriately adopted.

Figure 7:
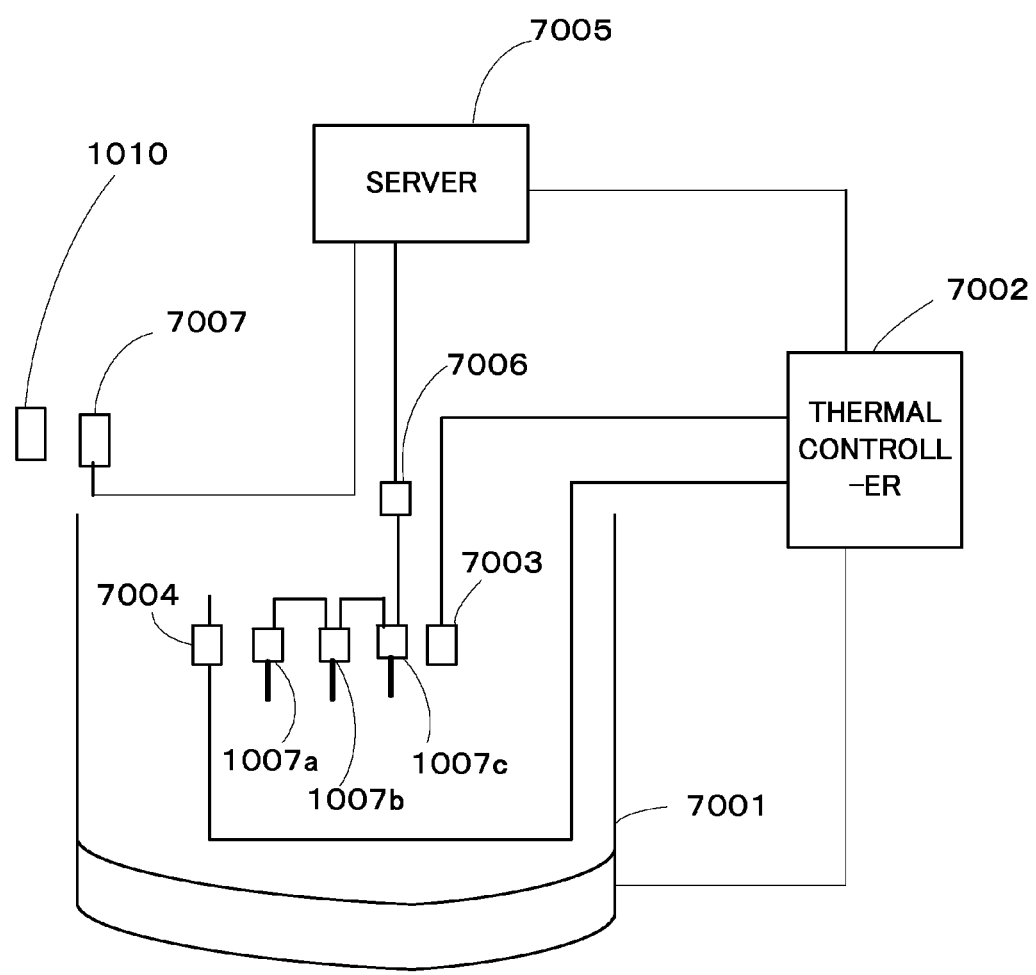
FIG. 7 is a conceptual diagram of a calibration location.

FIG. 7 is a conceptual diagram of a calibration location which comprises a constant temperature reservoir 7001, a thermal controller 7002 that controls the temperature pattern of the constant temperature reservoir, standard thermometers 7003 and 7004 connected to the thermal controller, a server 7005 connected to the thermal controller, a network connector 7006 connected to digital probes 1007a, 1007b and 1007c to be calibrated and an RFID reader/writer 7007 that write calibrate data of the calibration result in the RFID card 1010 corresponding to the digital probes to be calibrated.

The operations of the thermal controller and the server shown here are materialized by executing a control program such as pre-assembled firmware or the like in a processor of a control circuit and by cooperating with various devices such as an implemented heater, chiller and the like. These programs are recorded in a computer readable medium, read from the recording medium by the processor and executed by user's operations or by receiving signals from the device configuring the controller.

Figure 8:
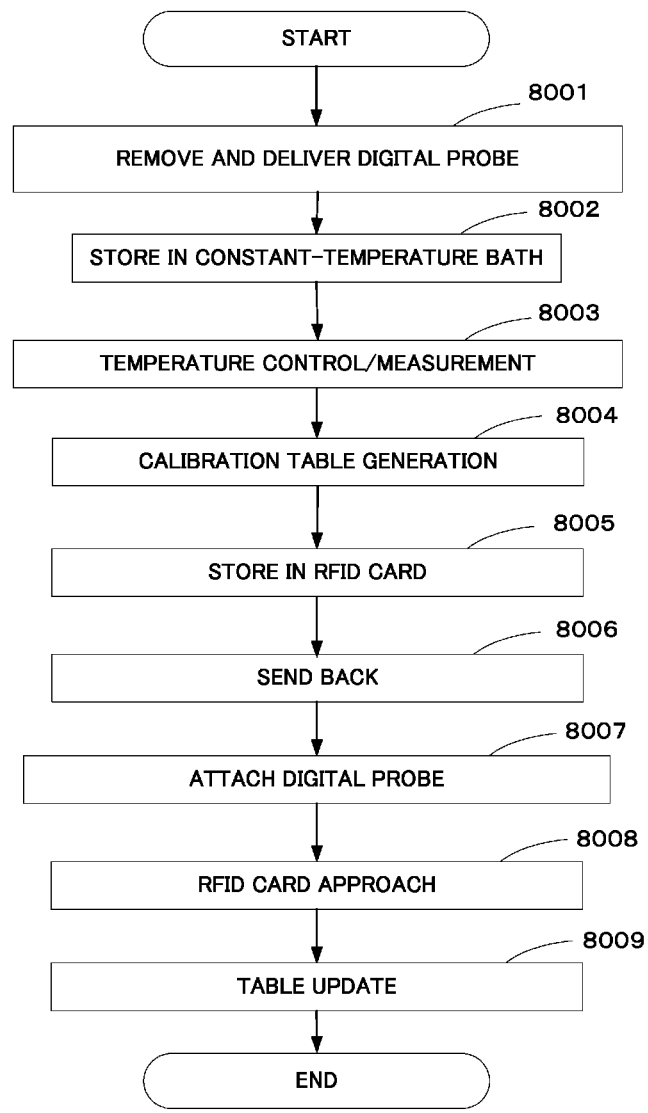
FIG. 8 is a flowchart showing calibration related work.

FIG. 8 is a flowchart showing a calibration related work/operation in the present embodiment.

Removal of digital probes and delivering to a calibration facility by the user are performed at step 8001. The delivering items are the digital probes 1007a, 1007b and 1007c to be calibrated and an RFID card 1010 corresponding to the digital probes 1007a, 1007b and 1007c only. As the other digital probes and the thermometer body can be left at the temperature measuring site, there is an effect of largely alleviating delivery troubles. Being capable of continuing measurements at measuring points other than the calibrating points contribute to continuity of measurement works.

At step 8002, the person in charge of calibration stores digital probes at a predetermined measuring position in the constant temperature reservoir. Although, in FIG. 7, the digital probes are set between two standard thermometers, the measuring positions of the present disclosure are not limited to these positions. Positions, at which digital probes and standard thermometers are considered to be in the same temperature environment, may appropriately be adopted.

At step 8003, the temperature control by the program of the thermal controller, the output of the control temperature from the standard thermometers, and the digital output value from the digital probes are associated and recorded.

Figure 9:
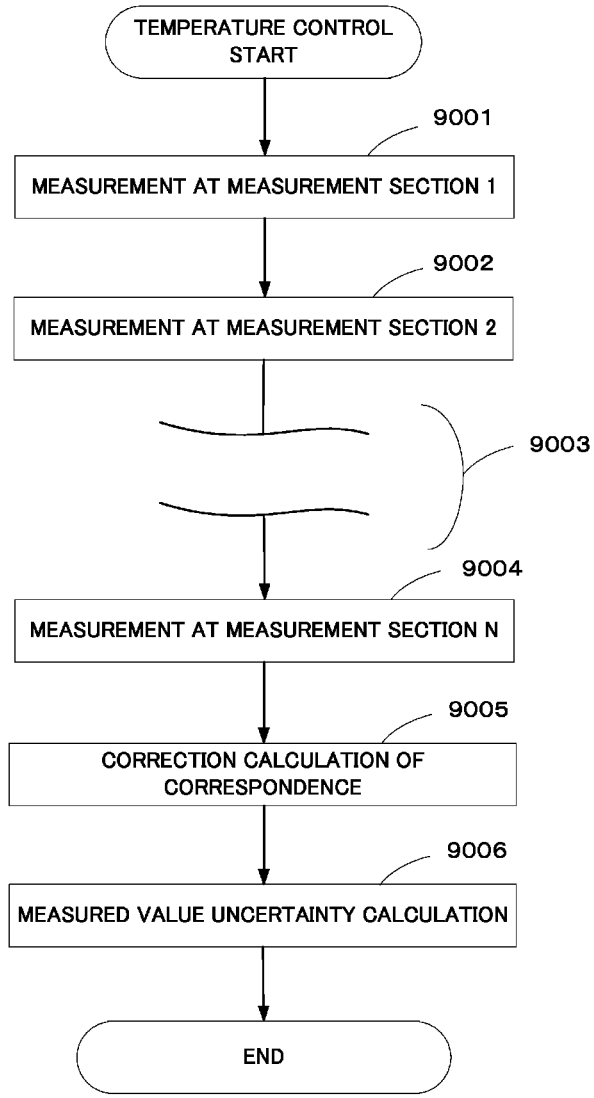
FIG. 9 is a flowchart showing temperature control and recording.

FIG. 9 is a flowchart showing procedures of temperature control and recording. When started, the temperature control of the constant temperature reservoir is performed and the temperature in the constant temperature reservoir is controlled in such a way that a predetermined temperature curve is drawn according to the aforementioned program.

At step 9001, recording at a measuring point 1 is performed. Subsequently, at step 9002, recording at a measuring point 2 is performed. Then, as shown in step 9003, recording of n times, where n is the number of established measuring points x, is performed. Recording is repeated up to the recording at the measuring section n as shown in step 9004.

Figure 10:
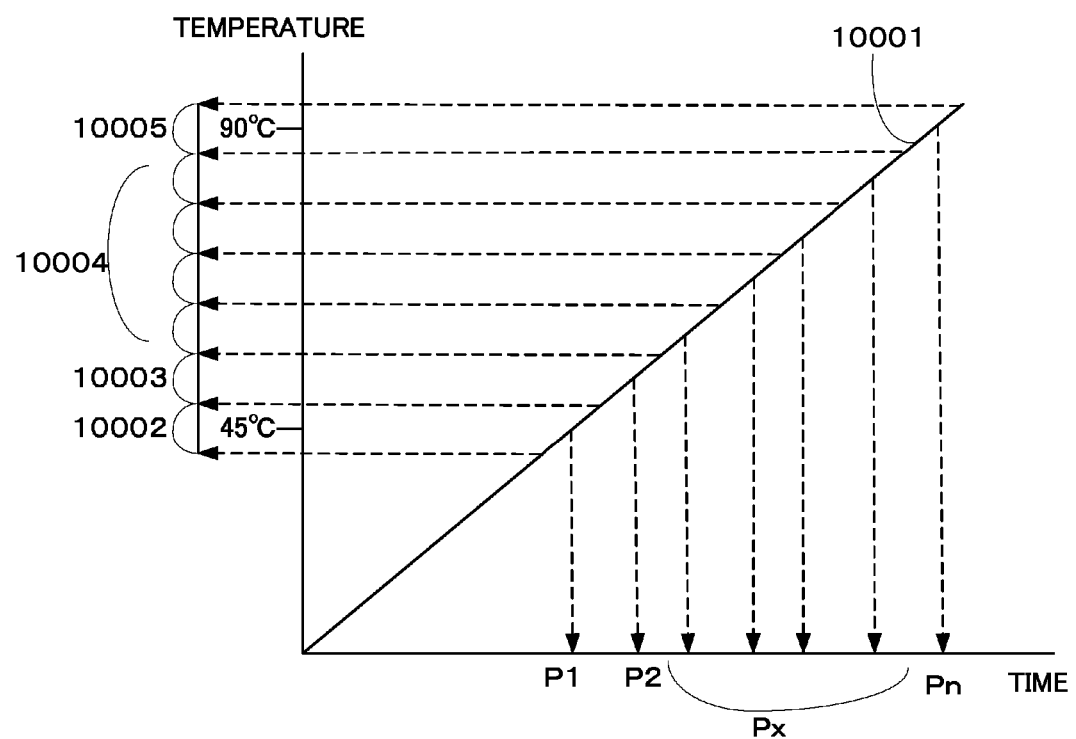
FIG. 10 is a graph showing an adopted temperature curve with the relationship of time and control target temperatures.

FIG. 10 is a graph showing an adopted temperature curve 10001 with the relationship between time and control target temperatures. The temperatures to be recorded here is between 45 degrees C. and 90 degrees C. This measurement section is divided into n subsections such as a subsection 1 indicated by a reference number 10002, a subsection 2 indicated a reference number 10003, a plurality of subsections x indicated by a reference number 10004, a subsection n indicated by a reference number 10005.

P1 is the measuring point 1 arranged in the subsection indicated by the reference number 10002. P2 is the measuring point 2 arranged in the subsection indicated by the reference number 10003, being followed by the plurality of measuring points x indicated by Px. Measuring points are established up to the nth measuring point Pn.

At step 9005, a calculation correcting correspondence of the standard thermometer output and the digital output is performed based on the temperature tracking difference of a predetermined standard thermometer and a digital probe to be calibrated by an operation of the server 7005. Values checked in the specification and/or test of the product may be used for the temperature tracking difference.

In order to measure a temperature correctly, it is common that one has to wait until the temperature of a standard thermometer and the temperature of a digital probe become balanced. In the calculation here, in order to perform recording continuously, a balance point is estimated by applying a predetermined formula to a temperature change pattern until both temperatures reach an equilibrium point. Based on this estimation, the digital probe output corresponding to the output of the standard thermometer is estimated at a high speed. The digital probe output based on this estimation is set to digital output to be recorded.

Furthermore, at step 9006, measured temperature uncertainty calculation is performed for each measuring point by an operation of the server 7005. An arithmetic average of outputs from the two standard thermometers is calculated to be a measured temperature. Uncertainty is shown by a total value of the analytical capability of the standard thermometers and uncertainty of temperature control of the constant temperature reservoir indicated by output differences from the plurality of the standard thermometers.

Although the calculation method adopted here is a method in which, after all are recorded, the calculation is performed in a mass like in a batch process, a method in which each record is sequentially calculated may be adopted.

Measured temperatures for each measuring point are obtained associated with the digital output of the digital probe. The temperature pattern 10001 shown in FIG. 10 is merely an example. When the constant temperature reservoir has a sufficient thermal capacity, a method may be adopted in which a measuring section for a steep slope temperature pattern is established, the standard thermometer output and the digital output are sampled for a shorter interval in this section and data associating digital output with measured temperatures is obtained.

FIG. 8 is explained again. At step 8004, a calibration table as the result of the calibration is generated from obtained data by an operation of a server.

FIG. 11 is a table showing contents of a calibration table using records in the temperature control of FIG. 10, the table comprising the calibration result at the measuring point P1 in the subsection 1 indicated by 11001, the calibration result at the measuring point P2 indicated by 11002, the calibration result at the measuring point Px indicated by 11003, the calibration result at the measuring point Pn indicated by 11004. Digital outputs 11005, measured temperatures 11006, calibration values 11007, uncertainties 11008 are stored for each measuring point.

If pairs of digital outputs 11005 and measured temperatures 11006 for each measuring point that are associated and obtained are taken as record points (digital output, measured temperature), a digital output/temperature characteristic curve is formed by connecting record points continuously obtained in sufficiently small subsections. This characteristic curve is used for calibration of the display temperature generation.

Figure 12:
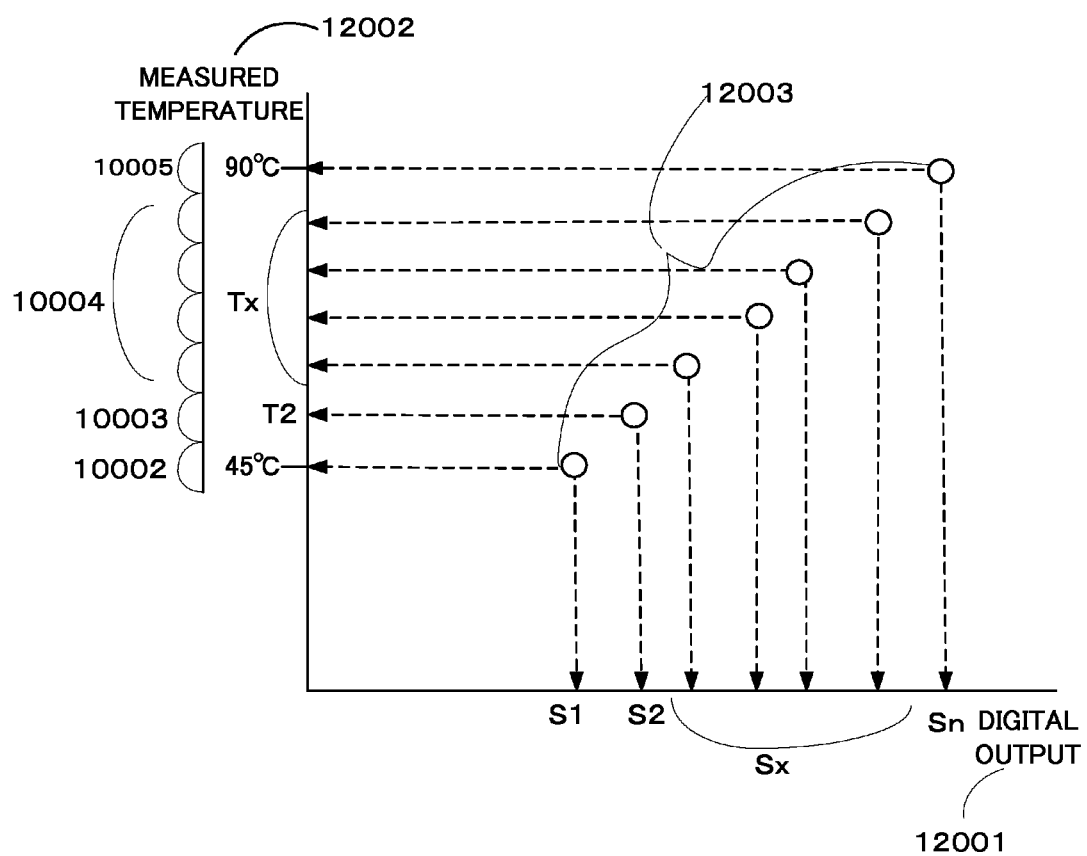
FIG. 12 is a graph showing coordinates of records at measuring points, x-axis being digital outputs, and y-axis being measured temperatures.

FIG. 12 is a graph showing coordinates of records at measuring points shown in FIG. 10, x-axis being digital outputs 12001, y-axis being measured temperatures 12002 and the coordinates being indicated by circles. If coordinates shown in 12003 are connected, the coordinate connection obviously represents the temperature characteristic curve of the digital probe itself.

When a record corresponding to a certain digital output is not present, one may take either an average of a measured value of the records on both sides of the value, or a coordinate on a line connecting points on both sides.

When sampled in more than two subsections, there is an effect that can generate a display temperature more accurate than the display temperature using an approximate curve which is generated by recording conventional two points. Especially when a subsection having a sufficiently short length of the resolution level of the standard thermometer is established, the most accurate calibration possible in the calibration facility of the example can be performed.

When a method in which temperatures are measured at a predetermined period is adopted, if the established period is so short that the temperature difference of adjacent measuring points reaches a resolution level of a standard thermometer, the most accurate calibration possible in the calibration facility of the example can be performed.

Although calibration data is generated here to which uncertainty, which is a test certificate item, is added to the elements of the calibration table, calibration results of the present disclosure are not limited to this and a certificate item certifying legacy from the international standard of the standard thermometer and the like may be added.

At step 8005, the calibration data is stored into the RFID card 1010 by the cooperative operation of the server 7005 and the RFID reader/writer 7007. The calibration data is written into the RFID card 1010 approached close to the RFID reader/writer 7007 by the person in charge of calibration by an instruction to write from the server.

At step 8006, the digital probes and RFID card are sent back by the person in charge of calibration and/or the like.

At step 8007, the digital probes are installed by the user or the like. At step 8008, the RFID card returned from the calibration location is approached close to the RFID reader 1009 at the location to be measured by the user or the like. At step 8009, the following operations are performed. First, the calibration execution command 3004 stored preliminarily in the RFID card 1010 is transmitted to the thermometer body 1001 by the communication function of the RFID reader and card. Then, the calibration table stored in the memory 2002 in the thermometer body is rewritten into the calibration table 3008 stored in the RFID tag by the operation of the calibration result capturer 2003. As the result of these operations, the calibration table at the reference destination is updated. The accuracy management in the present embodiment is materialized.

Second Embodiment

Figure 13:
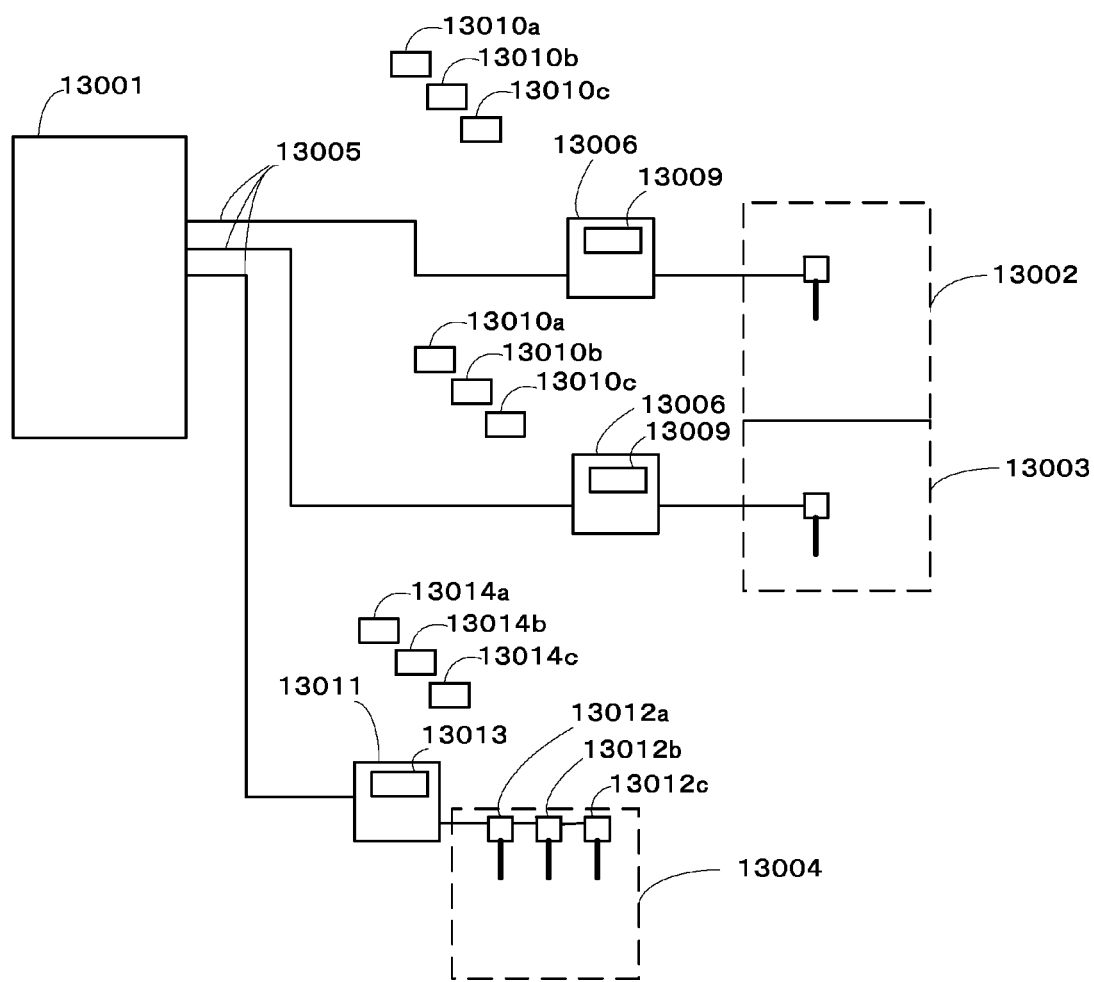
FIG. 13 is an external view showing an installation condition of a thermometer in a second embodiment.

FIG. 13 is an external view showing an installation condition of the thermometer in the second embodiment, a thermometer body 13001, a chamber A13002 of a first refrigerator which is the first object to be measured, an ice temperature chamber B13003 of the first refrigerator which is the second object to be measured, and a second refrigerator 13004 which is the third object to be measured are established in the second embodiment. Each object to be measured here is established at distant locations to be measured. Each location to be measured and the thermometer body 13001 are connected via communication lines 13005.

Apparatuses installed at the first location to be measured are explained in detail. The communication lines 13005 are connected to a network unit 13006. The network unit is connected to a digital probe 13007 and relays the digital output from the digital probe to the communication lines. The digital probe is fixed with regard to the chamber A13002 to be measured and sends digital output in response to the chamber temperature. Although a thermometer comprising one digital probe is adopted here, the thermometer of the present disclosure is not limited to this and other types may appropriately be adopted depending on temperature objects to be measured and thermometer installation sites. The network unit 13006 comprises an RFID reader 13009 and transmits data stored in the memory of the card to the thermometer body approached by any of three RFID cards 13010*a*, 13010*b* and 13010*c* arranged corresponding to the first location to be measured 13002.

The RFID card 13010*a* is a card for calibration, the RFID card 13010*b* is a card for communication establishment and the RFID card 13010*c* is a card for switching the alarm operation mode.

The second location to be measured also has a configuration similar to the first location to be measured.

Apparatuses installed at the third location to be measured are explained in detail. The communication lines 13005 are connected to a network unit 13011. The network unit is connected to three digital probes 13012*a*, 13012*b* and 13012*c* via a daisy chain and relays the digital output from the digital probes to the communication lines. The digital probes are fixed with regard to the inside the second refrigerator to be measured and sends digital output in response to the inside temperature. Although a thermometer comprising three digital probes is adopted here, the thermometer of the present disclosure is not limited to this and other types can appropriately be adopted depending on temperature objects to be measured and thermometer installation sites. The network unit 13011 comprises an RFID reader 13013 and transmits data stored in the memory of the card to the thermometer body approached by any of three RFID cards 13014*a*, 13014*b* and 13014*c* arranged corresponding to the second refrigerator 13004 which is the third location to be measured.

The RFID card 13014*a* is a card for calibration, the RFID card 13014*b* is a card for communication establishment and the RFID card 13014*c* is a card for switching the alarm operation mode.

Figure 14:
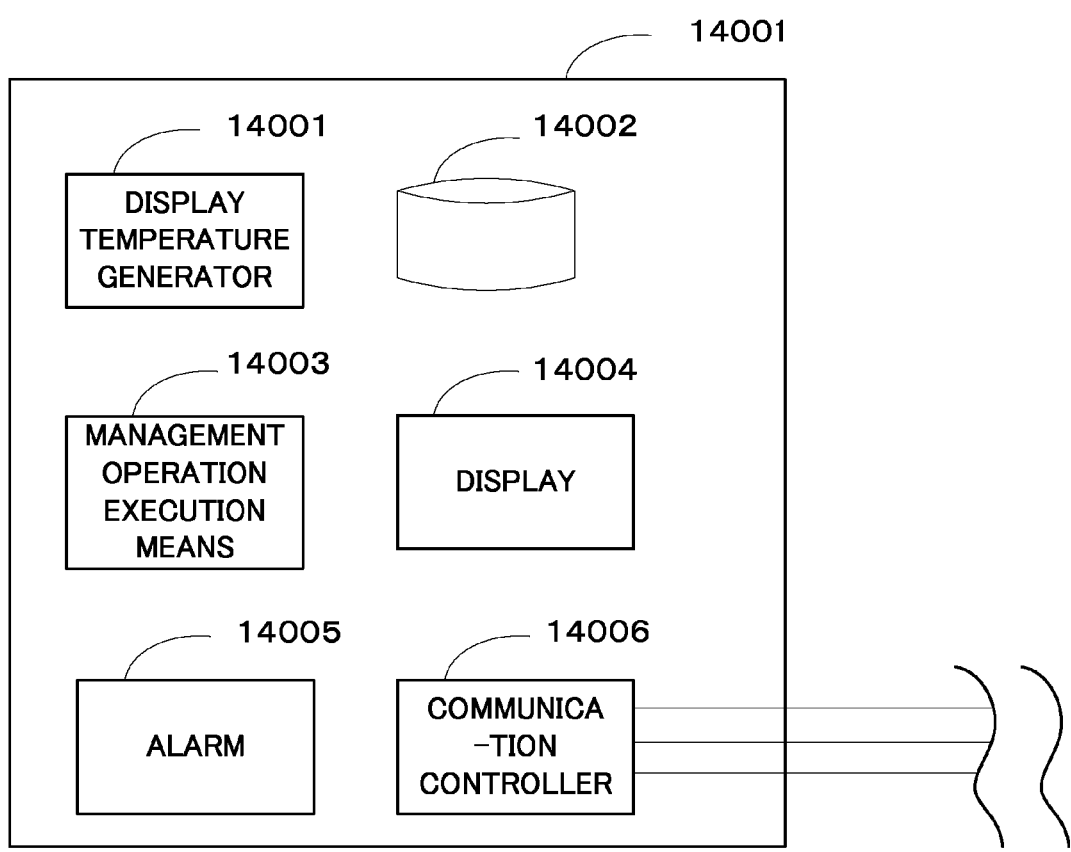
FIG. 14 is a configuration diagram of a thermometer body.

FIG. 14 is a block diagram showing the internal configuration of the thermometer body 13001 which comprises functions of a display temperature generator 14001, a memory 14002 in the thermometer body, a management operation execution means 14003, a display 14004, an alarm 14005 and a communication controller 14006. Although the management operation execution means is installed in the thermometer body, the management operation execution means of the present disclosure is not limited to the thermometer body and other configurations may be arranged as a configuration of the refrigerator itself.

Each function shown here is materialized by executing a control program such as preassembled firmware or the like in a processor of a control circuit and by cooperating with various devices implemented. These programs are recorded in a computer readable recording medium, read from the recording medium by the processor and executed by user's operations or by receiving signals from a device comprising a controller.

The display temperature generator 14001 receives digital output and generates a display temperature in reference to the calibration table stored in the memory 14002 in the thermometer body.

The calibration table here is defined as an information table in which digital output and values calibrated to actual temperatures are associated and recorded. The calibration table has a data structure that can easily generate a display temperature by searching a calibrated value corresponding to the digital output. Even when the calibrated value does not completely match the digital output, a display temperature corresponding to any digital output can be generated by appropriately adopting a method in which an average value of recorded information adjacent digital output is taken as the display temperature.

(Management Operation)

The management operation execution means 14003 is a function part executing the management operation related to measurement accuracy. When RFID cards arranged at each location to be measured are approached close to the RFID reader arranged at the location, the management operation execution means 14003 receives the command stored in the RFID card and executes the management operation established corresponding to the command preliminarily.

A display 14004 comprises a display device such as liquid crystal and the like and displays a display temperature generated from the digital output from the digital probes.

An alarm 14005 receives a display temperature, compares the received temperature with a predetermined normal temperature and sounds an alarm when a temperature error is detected. The normal monitoring mode and the cleaning mode which is set during the cleaning work and which is one kind of maintenance work, are switched for operating the alarm operation.

Temperature and/or temperature change data which objects to be measured normally indicate in each operation mode may be adopted as data indicating a normal temperature. This is useful for effectively managing data as a generated display temperature.

Switching of the alarm operation mode is further explained hereinafter.

Figure 15:
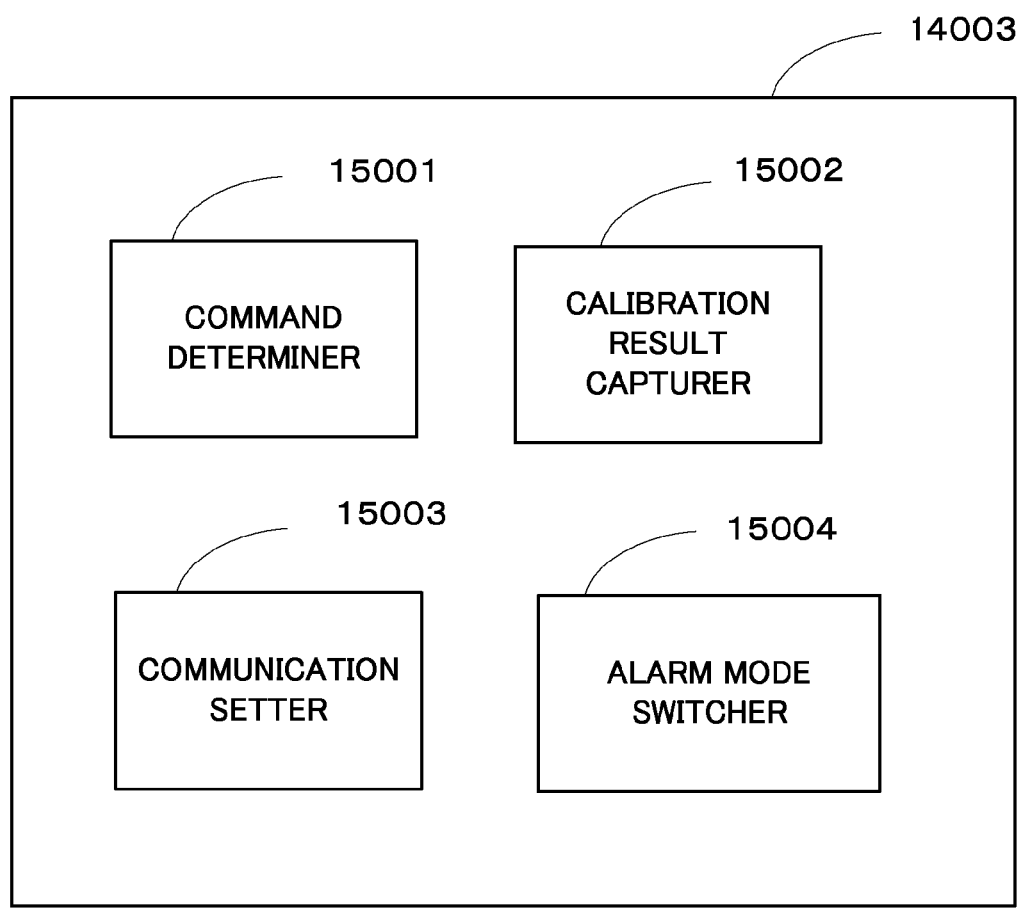
FIG. 15 is a block diagram showing a functional configuration of the management operation execution means.

FIG. 15 is a diagram showing details of the functional configuration of the management operation execution means 14003, which comprises a command determiner 15001, a calibration result capturer 15002, a communication setter 15003 and an alarm mode switcher 15004.

Figure 16:
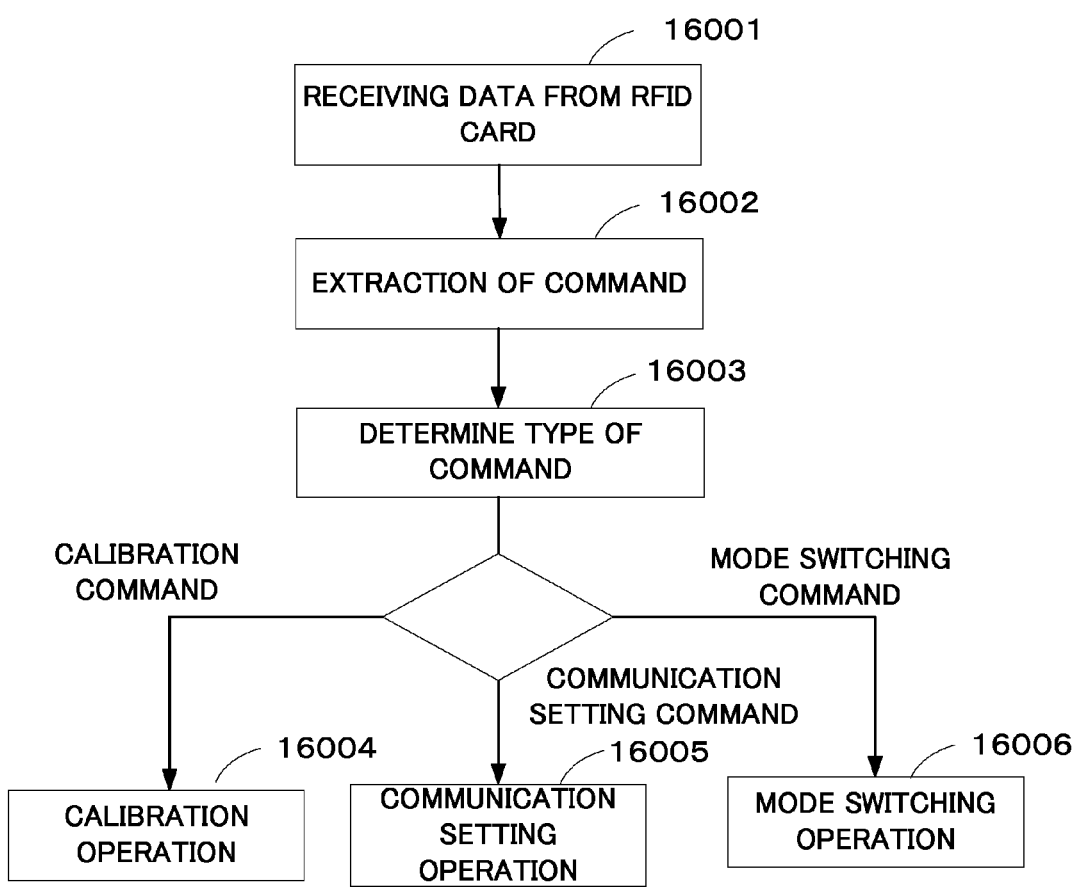
FIG. 16 is a flowchart showing operations of the command determiner.

FIG. 16 is a flowchart showing operations of the command determiner 15001.

At step 16001, the command determiner receives data transmitted while being approached by the RFID card.

At step 16002, a command is extracted from received data in the command determiner.

At step 16003, the command determiner determines a type of a command included in the received data.

If the determined result is a calibration command, at step 16004, calibrated data received in the calibration result capturer 16002 is transmitted and calibration operations are executed. The calibration operation is similar to that of the calibration result capturer in the above first embodiment.

If the determined result is a communication setting command, at step 16005, communication setting data received in the communication setter 15003 is transmitted and communication setting operations are executed. The execution of communication setting is similar to the operations of the communication setter in the above first embodiment.

If the determined result is a mode switching command, at step 16006, operation switching signals preset in the alarm mode switcher 15004 are transmitted and switching of the alarm operation mode is executed.

(Data Structure Stored in RFID Cards)

Data stored in three types of RFID cards is explained here. Although the explanation here is regarding the three RFID cards corresponding to the first location, the explanation here similarly applies to the three RFID cards corresponding to other locations to be measured.

Figure 17:
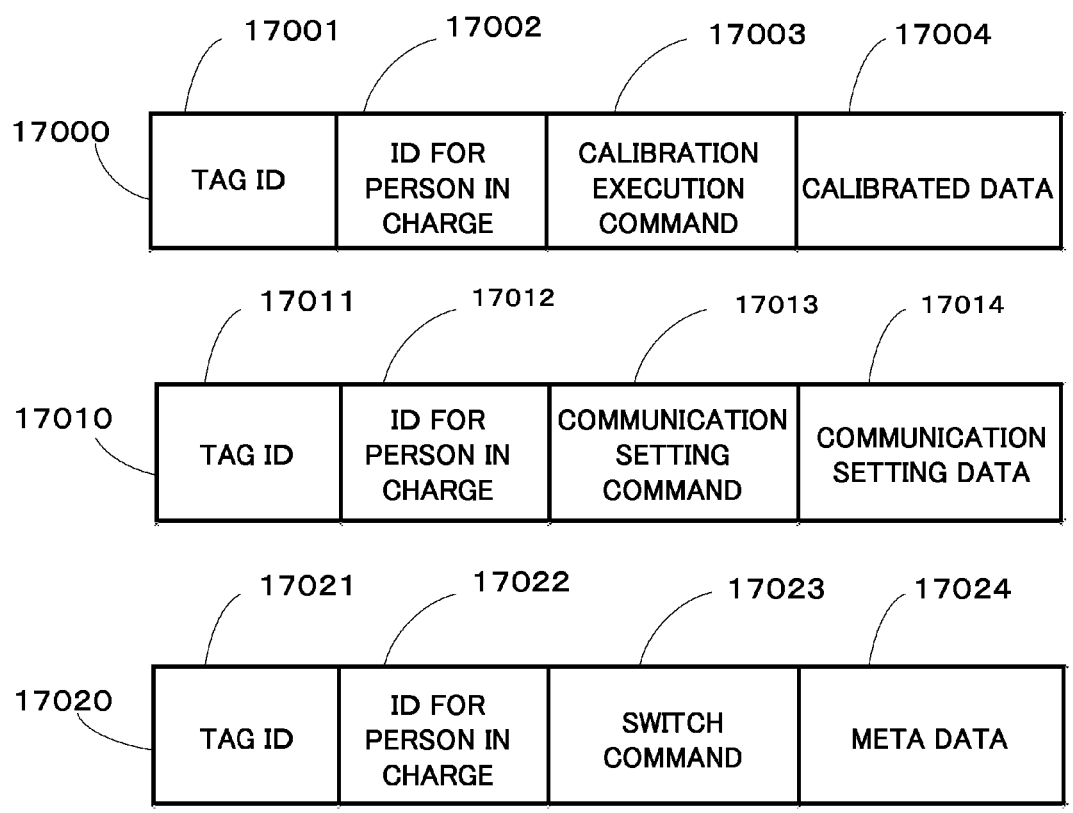
FIG. 17 is a block diagram showing a data structure stored in three types of RFID cards.

FIG. 17 is a block diagram showing a data structure stored in three types of RFID cards. 17000 is an RFID card for calibration in which a tag ID 17001, an in-charge ID 17002, a calibration execution command 17003 and calibration data 17004 are stored. 17010 is an RFID card for communication setting in which a tag ID 17011, an in-charge ID 17012, a communication setting command 17013 and communication setting data 17014 are stored.

17020 is an RFID card for switching the alarm operation mode in which a tag ID 17021, an in-charge ID 17022, a switch command 17023 and metadata 17024 are stored.

As inclusion of an in-charge ID can specify a person in charge who performed a management operation, management responsibility is clarified by checking history data regarding the management operation.

The metadata 17024 is data showing temperatures or temperature change states shown when the refrigerator located in the location to be measured is being cleaned. During the temperature is monitored at the after-explained cleaning mode, this data is useful for activating the alarm when a temperature is detected, which is to be alarmed even at the cleaning mode. Because the allowable temperature range during cleaning can be determined by comparing with the metadata.

The functional configuration of the RFID card is the same as FIG. 4 in the first embodiment. The RFID card for switching the alarm operation mode displays metadata regarding the temperature during cleaning on the data display 4004.

The configuration of the digital probe is the same as FIG. 5 in the first embodiment. The network unit and the digital probe are connected via a daisy chain for communication in locations to be measured with a plurality of digital probes.

The configuration of the network unit is the same as FIG. 6 in the first embodiment.

(Switching of the Alarm Operation Mode)

Figure 18:
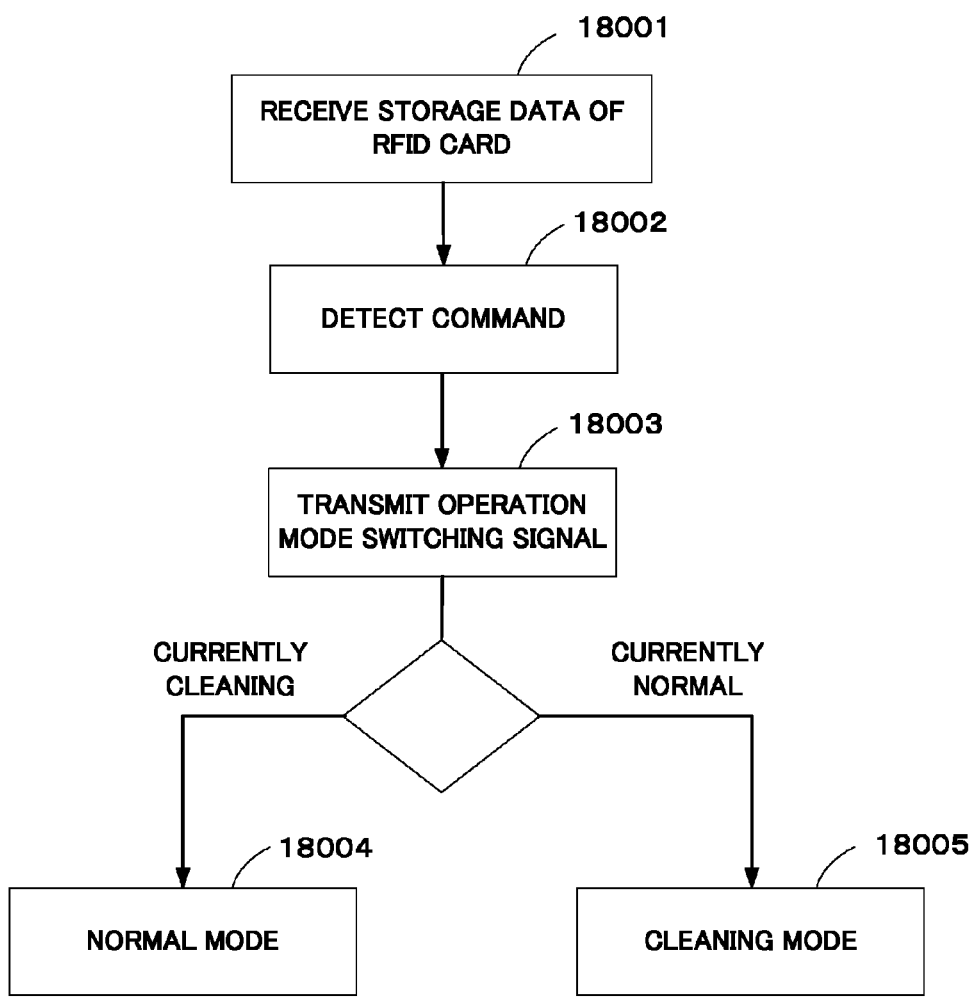
FIG. 18 is a flowchart showing switching of the alarm operation mode.

Switching of the alarm operation mode which is not described in the first embodiment is explained using the flowchart of FIG. 18.

At step 18001, the data stored in the RFID card is received after determining the types of the aforementioned command.

At step 18002, the command is detected.

At step 18003, switching signals of the operation mode is transmitted to the alarm.

The alarm 14005 comprises a toggle switch function and switches the alarm operation mode when receiving switching signals. That is, if the cleaning mode is currently set, the mode is switched to the normal mode of step 18004. If the normal mode is currently set, the mode is switched to the cleaning mode of step 18005.

With this configuration, a person in charge of maintenance can switch the alarm operation mode simply by approaching the RFID card for switching the alarm operation mode close to the RFID reader which is disposed at a refrigerator to be cleaned.

Switching the alarm operation mode, making use of visibility that the person in charge is just in front of an object to be cleaned, can avoid such an accident that changes the alarm operation mode of a wrong object.

Although the normal mode and the cleaning mode are adopted here as the alarm operation modes, modes that can be adopted in the present embodiment are not limited to these. When an item is put in or delivered to a refrigerator or a refrigerator room to be monitored, the temperature rises because the refrigerator door or the like is opened. In such a case, a method may be adopted in which the alarm operation mode is switched by presetting the storing mode and/or a delivering mode by approaching a predetermined RFID card close to the RFID reader before the person in charge or the user opens the door or the like.

If such a storing mode and/or a delivering mode is adopted, these modes can have an effect that one can properly handle the temperature change at the time of putting an item into or taking an item out from a strictly temperature-controlled refrigerator as the temperature change based on a routine job, not as an abnormal temperature change to be alarmed.

The embodiments disclosed at this time should be considered to be exemplary, not restrictive in all respects. The scope of the present invention is intended to be shown by claims, not by the above explanation, and to include all modifications and equivalents within the meaning of the scope of claims.

The present application claims the benefit and priority of JP2013-019083 which is herein incorporated by reference.

INDUSTRIAL APPLICABILITY

Industries in which strictly precise temperature management is required are broad range of industrial fields such as food industries, pharmaceutical industries or precision machinery industries. The thermometer calibration system according to the present disclosure can be applied in any of the above industries.

REFERENCE SIGNS LIST

1001 Thermometer body
1002 First location to be measured
1005 Communication lines
1006 Network unit
1007 Sensor part
1009 RFID reader installed at the network unit
1010 RFID card

The invention claimed is:

1. A thermometer management system comprising the components of:
   a) one or more digital probes that include a probe that senses and reacts to a temperature of an object to be measured, and that output a digital output in response to the probe;
   b) a display temperature generator that inputs the digital output and generates a display temperature;
   c) a management operation executor that executes, according to a received predetermined command, a predetermined management operation that is associated with the command;
   d) an RFID tag that stores the command and management data that comprises metadata showing temperatures or temperature change states of the object to be measured;
   e) an RFID reader that transmits information received from the RFID tag to the management operation executor; and
   f) an alarm that detects an abnormal temperature and alarms according to a plurality of alarm operation modes;
   wherein the RFID reader receives the management data from the RFID tag and transmits the received management data to the management operation executor by being triggered by the RFID tag approaching close to the RFID reader, and the management operation executor executes the management operation based on the command that is included in the received management data, and
   wherein the management operation comprises execution of the switching function that switches the alarm operation mode of the alarm to an alarm operation mode that detects the abnormal temperature and alarms based on the temperatures or the temperature change states shown in the metadata included in the management data when the command indicates a switching of the alarm operation mode.

2. The thermometer management system according to claim 1, wherein
   the management operation further comprises execution of a function specifying a person in charge of the switching.

3. The thermometer management system according to claim 2, wherein
   the object to be measured is within the storage of temperature managing apparatuses;
   the management operation executor is disposed in the temperature managing apparatuses; and
   the alarm operation mode comprises at least one operation mode selected from a cleaning mode which is set during the maintenance of the storage, a storing mode which is an operation mode when a storing objet is being stored in the storage, and a delivery mode which is an operation mode when a delivering object is being delivered from the storage.

4. The thermometer management system according to claim 2, wherein
   the switching function is a toggle switch function of the alarm operation mode, and alternatively switches the modes by being triggered when the RFID tag approaches close to the RFID reader.

5. The thermometer management system according to claim 1,
   wherein the RFID reader is disposed at a network unit that intervenes communication between the digital probe disposed at the location of the object to be measured and the management operation executor.

6. A thermometer management system comprising the components of:
   a) one or more digital probes that include a probe that senses and reacts to a temperature of an object to be measured, and that output a digital output in response to the probe;
   b) a display temperature generator that inputs the digital output and generates a display temperature;
   c) a management operation executor that executes, according to a received predetermined command, a predetermined management operation that is associated with the command;
   d) an RFID tag that stores management data including the command; and
   e) an RFID reader that transmits information received from the RFID tag to the management operation executor;
   wherein the command is transmitted to the management operation executor by being triggered when the RFID tag approaches close to the RFID reader, and the management operation is executed, and
   wherein generation of the display temperature is executed in reference to a predetermined calibration table;
   wherein the management data further includes a calibration table for the update; and
   wherein the management operation includes a calibration operation that updates the predetermined calibration table referenced by the display temperature generator for generating the display temperature to the calibration table for the update.

* * * * *